United States Patent
Duan et al.

(10) Patent No.: US 10,509,631 B2
(45) Date of Patent: Dec. 17, 2019

(54) TECHNIQUES FOR GENERATING CUSTOMIZED SOFTWARE

(71) Applicant: EMC IP Holding Company LLC, Hopkinton, MA (US)

(72) Inventors: Wei Duan, Sichuan (CN); Qiang Ma, Chengdu (CN); Jia Rui Tang, Sichuan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/953,766

(22) Filed: Apr. 16, 2018

(65) Prior Publication Data

US 2019/0317735 A1  Oct. 17, 2019

(51) Int. Cl.
  *G06F 8/34* (2018.01)
  *G06F 9/48* (2006.01)
  *G06F 11/36* (2006.01)

(52) U.S. Cl.
  CPC .............. *G06F 8/34* (2013.01); *G06F 9/4843* (2013.01); *G06F 11/3684* (2013.01); *G06F 11/3688* (2013.01)

(58) Field of Classification Search
  CPC ........................................................ G06F 8/34
  USPC ........................................................ 717/113
  See application file for complete search history.

(56) References Cited

U.S. PATENT DOCUMENTS

| | | | | |
|---|---|---|---|---|
| 7,543,269 B2 * | 6/2009 | Krueger | .................... | G06F 8/61 717/102 |
| 8,121,874 B1 * | 2/2012 | Guheen | ................ | G06Q 10/063 705/7.11 |
| 8,312,382 B2 * | 11/2012 | Gilboa | ...................... | G06F 8/38 715/762 |
| 8,719,776 B2 * | 5/2014 | Eteminan | .................. | G06F 8/34 717/106 |
| 10,117,697 B2 * | 11/2018 | Calvin | ............... | A61B 17/8833 |
| 2004/0117759 A1 * | 6/2004 | Rippert, Jr. | ............... | G06F 8/20 717/100 |
| 2006/0156278 A1 * | 7/2006 | Reager | ................... | G06F 9/454 717/104 |

(Continued)

OTHER PUBLICATIONS

"Create a Template for an Application"; OutSystems.com website [full url in ref.] as captured by the Wayback Machine Internet Archive (archive.org) on Sep. 18, 2017 (Year: 2017).*

(Continued)

*Primary Examiner* — Qing Chen
*Assistant Examiner* — Clint Thatcher
(74) *Attorney, Agent, or Firm* — Muirhead and Saturnelli, LLC

(57) ABSTRACT

Techniques for customizing a software product may include receiving customization information describing customizations to the software product requested by a user; submitting a request including the customization information to a web service; and responsive to receiving the request, performing processing comprising: creating, by the web service, a new job to generated a customized version of the software product in accordance with the customization information of the request; automatically generating at least one customized file in accordance with the customization information; generating the customized version of the software product including the at least one customized file; and testing the customized version of the software product.

22 Claims, 9 Drawing Sheets

(56) References Cited

U.S. PATENT DOCUMENTS

2011/0208338 A1* 8/2011 Eteminan ............... G06F 8/20
            700/97
2018/0189054 A1* 7/2018 Kalidindi ............... G06F 8/71

OTHER PUBLICATIONS

"Custom App Development or Template Applications? Here's How You Know"; Applt Ventures website [full url in ref.); Jun. 1, 2016 (Year: 2016).*

* cited by examiner

| Index | Description | Format | Customization | | | | |
|---|---|---|---|---|---|---|---|
| 1-1 | Application Name, it display multiple screens | A string name | Unisphere | | | | |
| 1-2 | Favorite Icon | picture format 32x | | Upload | | | |
| 1-3 | Model name prefix | Default: Unity | | | CNX | | |
| 1-3.1 | Model name mapping Unity | Default: 300 | | | | 3000 | |
| 1-3.2 | Model name mapping Unity | Default: 400 | | | | | 4000 |
| 1-3.3 | Customize support link/ URL | URL default: Dell.com/support | Partner.com/support | | | | |
| 1-3.4 | Button/link to OEM online store | Default: Enable | Hidden | | | | |

FIG. 3B

TECHNIQUES FOR GENERATING CUSTOMIZED SOFTWARE

BACKGROUND

Technical Field

This application generally relates to techniques for customizing software.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of customizing a software product comprising: receiving customization information describing customizations to the software product requested by a user; submitting a request including the customization information to a web service; and responsive to receiving the request, performing processing comprising: creating, by the web service, a new job to generated a customized version of the software product in accordance with the customization information of the request; automatically generating at least one customized file in accordance with the customization information; generating the customized version of the software product including the at least one customized file; and testing the customized version of the software product. The processing may further comprise automatically generating a new test case in accordance with the customization information, and wherein the testing may include executing code that includes the new test case. The testing may include selecting one or more tests which test features of the software product affected by the customizations requested by the user. The processing may include displaying a user interface of a generation wizard to the user, wherein the user interface includes a first portion listing customizable features of the software product and wherein the user interface includes a second portion used to preview any customization made to the software product using the first portion, wherein the generation wizard is used in connection with generating the customized software product. The processing may include specifying, using the user interface of the generation wizard, a first customization to the software product; and in response to said specifying, automatically updating the second portion of the user interface of the generation wizard to display the result of the first customization. The displayed result of the first customization may be performed without generating the customized version of the customized software product. The first customization may include a modification to information displayed in a user interface of the customized software product. The first customization may include a modification to an icon displayed in a user interface of the customized software product. Specifying the first customization may include providing an image file for a customized image to be displayed in a user interface of the customized software product rather than a default image. The first customization may include specifying a customized link displayed in a user interface of the customized software product and wherein, when the customized link is selected during execution of the customized software product, transfers control to a customized location identified in the first customization. The first customization may include modify an attribute of a user interface element that is displayed in a user interface of the customized software product, wherein the first customization includes modifying a default value for the attribute to a customized value for the attribute. The attribute may affect a visual aspect of the user interface element. The processing may include determining whether testing of the customized software product has completed successfully; and responsive to determining the customized software product has completed successfully, providing a notification to the user, wherein the notification identifies a website location from which the customized software product is downloadable. The method may include periodically determining statuses of jobs, wherein each of the jobs has been created as a result of a different request for customizations to the software product, wherein said different request is made using the generation wizard; and updating displayed information for the jobs in accordance with the statuses determined.

In accordance with another aspect of techniques herein is a system comprising: at least one processor; and a memory comprising code stored thereon, that when executed, performs a method of customizing a software product comprising: receiving customization information describing customizations to the software product requested by a user; submitting a request including the customization information to a web service; and responsive to receiving the request, performing processing comprising: creating, by the web service, a new job to generated a customized version of the software product in accordance with the customization information of the request; automatically generating at least one customized file in accordance with the customization information; generating the customized version of the software product including the at least one customized file; and testing the customized version of the software product.

In accordance with another aspect of techniques herein is a computer readable medium comprising code that, when executed, performs a method of customizing a software product comprising: receiving customization information describing customizations to the software product requested by a user; submitting a request including the customization information to a web service; and responsive to receiving the request, performing processing comprising: creating, by the web service, a new job to generated a customized version of the software product in accordance with the customization information of the request; automatically generating at least one customized file in accordance with the customization information; generating the customized version of the software product including the at least one customized file; and testing the customized version of the software product. The processing may include automatically generating a new test case in accordance with the customization information, and wherein said testing includes executing code that includes the new test case. The testing may include selecting one or more tests which test features of the software product affected by the customizations requested by the user. The processing may include displaying a user interface of a generation wizard to the user, wherein the user interface includes a first portion listing customizable features of the software product and wherein the user interface includes a second portion used to preview any customization made to the software product using the first portion, wherein the generation wizard is used in connection with generating the customized software product. The processing may include specifying, using the user interface of the generation wizard, a first customization to the software product; and in response to said specifying, automatically updating the second portion of the user interface of the generation wizard to display the result of the first customization.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3A, 3B, and 4 are examples of screenshots, and portions thereof, that may be included in a user interface of an application used in an embodiment in performing techniques described herein;

DETAILED DESCRIPTION OF EMBODIMENT(S)

Figure 1:
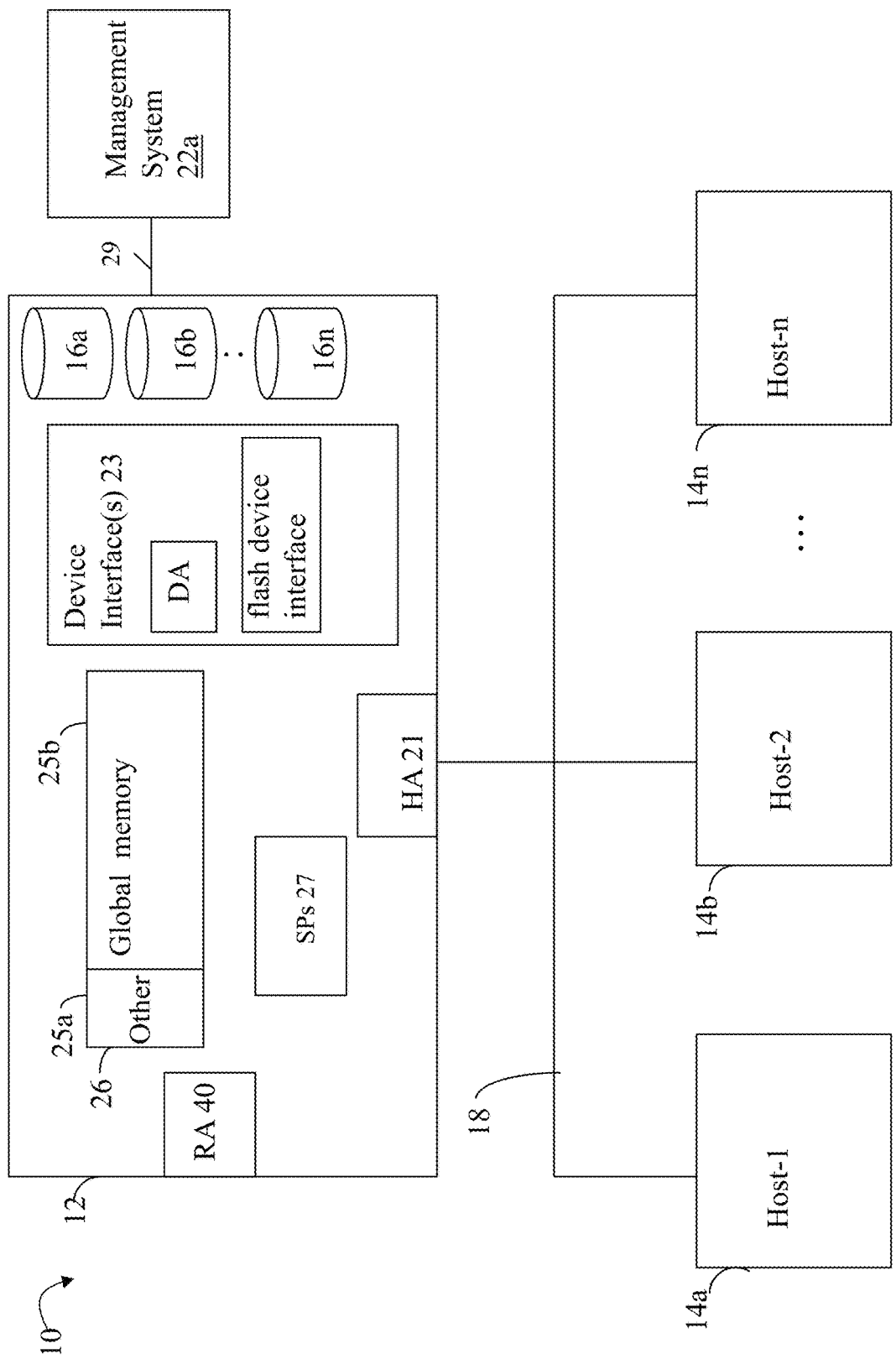
FIGS. 1, 5 and 8 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system or VNX® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with the software such as the data storage management software executing on management system 22a, it may be desirable to change or modify aspects of the software, such as aspects of the GUI, for rebranding purposes. For example, a data storage system vendor may provide such software and such rebranding may be performed for a partner of the vendor where the partner is a reseller, distributor, and the like, of the vendor's data storage system and software, such as the data storage system management software. In this case, the vendor may be considered an original equipment manufacturer (OEM) whose data storage system and software may then be included in systems of its partner whereby the partner then further sells the system to its customers. In such instances, it may be desirable to rebrand and customize aspects of the software for the particular partner. Such customization aspects may include, for example, modifying a displayed symbol of the business such as related to a copyright or trademark (e.g., to use a trademark of the partner rather than OEM), replacing a business logo or symbol (e.g., to be that for a partner rather than OEM), modifying functionality associated with a GUI item customized for the partner (e.g., such as responsive to a user selection made via the GUI, redirect the user to a partner-specific website or internet location rather than a default specific website or location related to the original vendor; allow buttons and various GUI features to be hidden, disabled or greyed out as the particular features may not be supported or wanted by the partner may vary), and the like.

Figure 2:
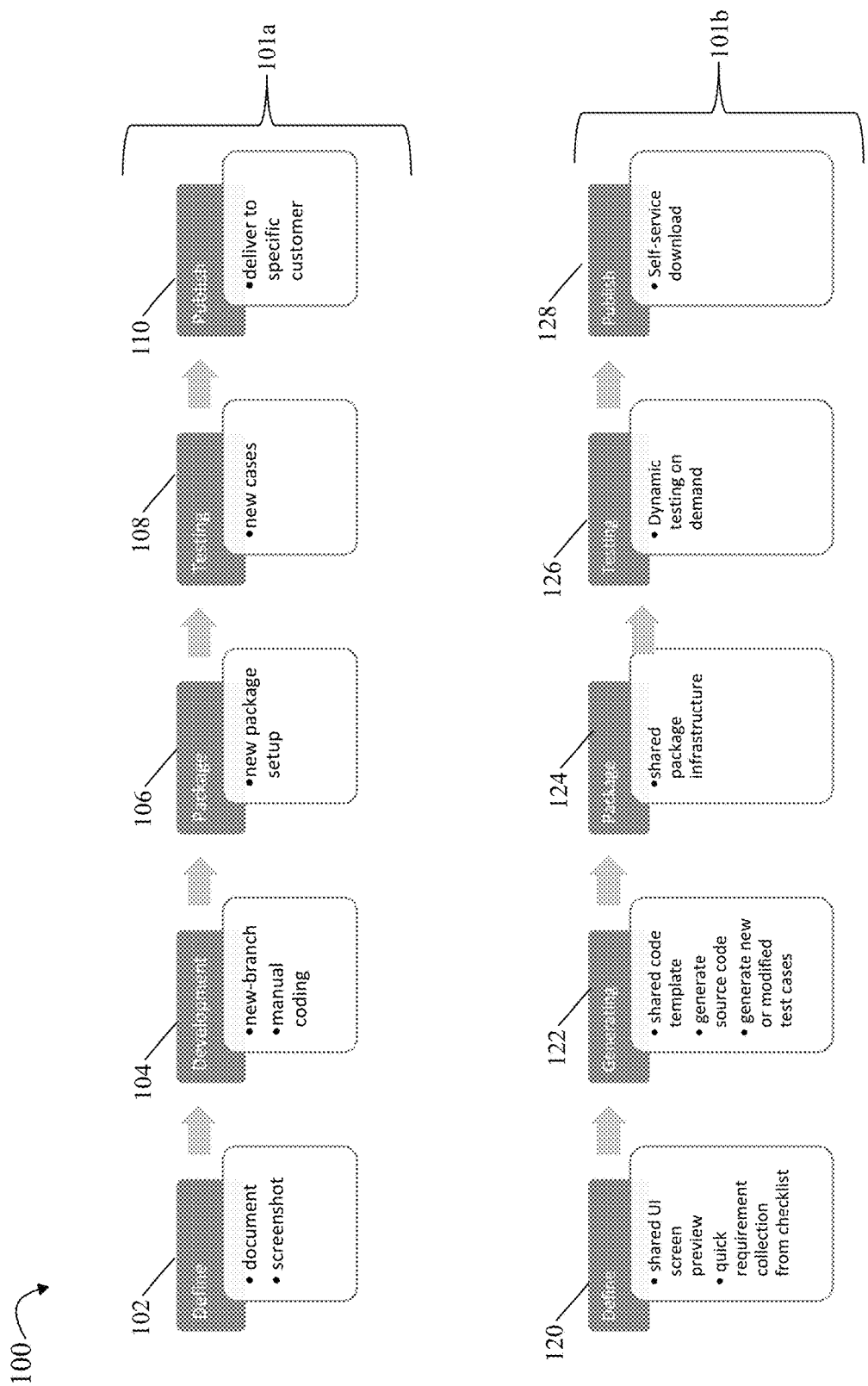
FIG. 2 is an example illustrating processing that may be performed in an embodiment not in accordance with techniques herein and also in at least one embodiment that is in accordance with techniques described herein.

Referring to FIG. 2, shown is an example 100 illustrating first overall processing 110a in at least one implementation not in accordance with techniques herein and second overall processing 110b as may be performed in an embodiment in accordance with techniques herein. The first processing 110a that may be performed in at least one implementation not in accordance with techniques herein may include defining 102 the customizations or changes required for the partner or other user, customer, distributor, and the like, of the OEM software product. In such an implementation process not using techniques herein, step 102 may include manually obtaining from the partner their particular customization requirements, such as through exchanges of multiple email messages, using a list completed manually by the partner. In response, the partner may gather different materials to return to the OEM regarding desired customization or modifications. Such materials may include, for example, the completed list mentioned above, an image file of the partner customized logo or picture, a screenshot or mocked-up UI display produced by the partner illustrating the desired customizations to the UI display (e.g., such as with the customized partner logo or picture replacing the original OEM or vendor logo/picture). Generally, the defining process step 102 may not be well-specified and the partner may provide any needed materials to express the desired customizations to the OEM. Processing of step 102 may be performed such as by manual multiple email (e.g., written) and/or phone (e.g., verbal) exchanges between the OEM and the partner. Once the customizations are defined 102, processing proceeds to development 104 which may include manually coding the desired requirements or modifications desired by the partner. From step 104, processing proceeds to step 106 where a new package or software product with the partner customizations is produced. Again, step 106 may be a manual process. From step 106, processing proceeds to step 108 where any new test cases are generated for the customizations made to the software product. Additionally, step 108 may include testing the customized software product with such new or modified test cases as well as other test cases testing other features of the customized software product. Generally, generating of the new test cases, modifying existing test cases and selecting relevant test cases for testing the customized software product may be performed manually. Step 108 may include manually trying to determine the particular test cases relevant to test impacted content and may be erroneous and time consuming. From step 108, processing proceeds to step 110 where, upon successful testing of the customized software product, the customized software product is delivered to the specific partner or customer that requested the customizations.

In at least one embodiment in accordance with techniques herein, processing 101b may be performed using an automated, efficient system and techniques which generate a customized software product such as using a web service system. Processing 101b may include defining 120 the desired customizations to be made to the software product. Step 120 may include, for example, logging into a website of the OEM or vendor where the partner, customer or other use is able to specify desired customizations and provide any needed inputs. Step 120 may include use of a generation wizard where the user is presented with a standard checklist in a GUI identifying those particular GUI features or elements that are available for customization. Via the standard checklist, the user is easily and completely notified of what content of the GUI is modifiable or customizable. Further, using such an interface and checklist the user may specify any desired customizations where such customizations may be displayed to the user in the context of the various application or software product UI screenshots. Also using the checklist, the user may identify the particular customizations desired, such as changes to default displayed UI elements, provide and upload to the OEM website any customized image files, and the like. Additionally, in at least one embodiment as described in following paragraphs, the user may be provided the option of previewing the customizations as expected to appear in the UI of the customized software product prior to actually generating the customized software product. The previewing option and functionality may be included within the UI of the application used to obtain the customization requirements. In response to receiving the customization requirements of the definition process step 120, the web service system generates 122 source code, configuration files, and new/modified test cases, as may be needed, based on the customizations obtained in the defining step 120. In at least one embodiment in accordance with techniques herein, the customer/partner changes, customizations and requirements obtained in step 120 may be stored in a persistent default profile for that particular customer or partner which may later be reused as a template when the partner or customer again performs customizations in connection with a later subsequent version of the software product. From step 122, processing may proceed to step 124 to produce the desired customized software product or package. From step 124, processing proceeds to step 126 where dynamic testing of the customized software product is performed on demand. The testing in step 126 may be performed using an automated test system which may automatically select test cases appropriate to test the modifications or customizations made to the software product (where such customizations are obtained in step 120). Also, such testing of step 126 may include automatically selecting desired test cases to test new as well as modified or impacted content with respect to the source code, UI features and customizations. Upon successful testing of step 126, the customized software product may be published 128 and made available for download to the partner or user also through the OEM website. In connection with at least one embodiment performing processing 101b in accordance with techniques herein, the processing 101b may be performed in an automated manner. The foregoing and other aspects that may be performed in an embodiment in accordance with techniques herein are described in more detail in following paragraphs.

Figure 3A:
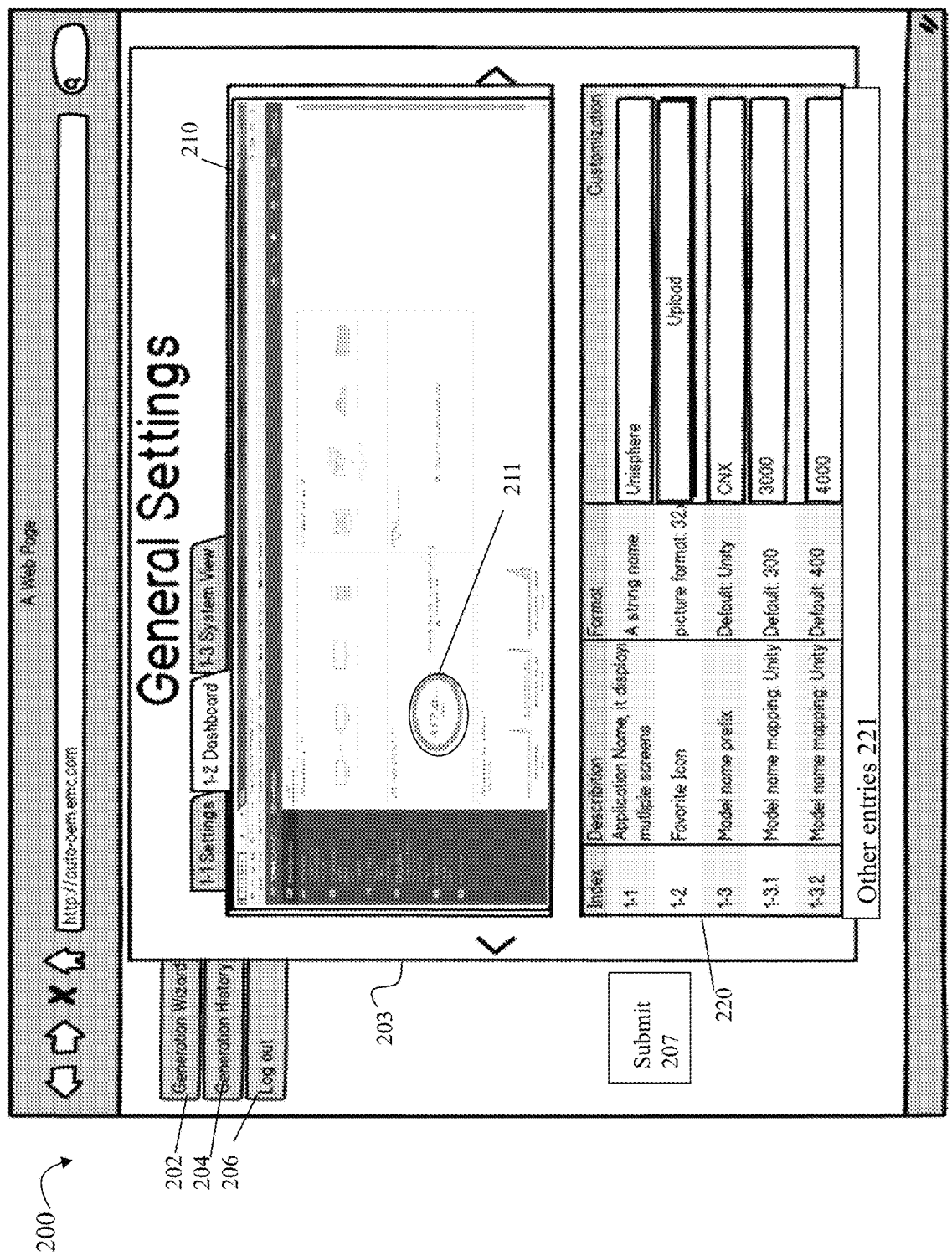

Referring to FIG. 3A, shown is an example 200 of screenshot that may be used in an embodiment in connection with techniques herein. The screenshot 200 may be included in a UI of an application, such as generator, used to obtain the customizations, automatically generate customized source files, and the like, as described herein. As noted above, a user, such as partner, that want to customizing the OEM software product, such as the data storage management application, may log into an OEM provided website where the user may be presented with 3 panels—202 generation wizard, 204 generation history, and 206 logout—which are navigation links of the generator or customization application provided by the OEM. Upon selection of 202 generation wizard, a user is redirected to the OEM customization forms page 203 which includes a top portion 210 and bottom portion 220. The top portion 210 includes tabbed screenshots of various UI elements or features within the context of the software product (e.g., management application) that may be customized by the user. In other words, each of the tabs 210a, 210b and 210c may denote a different screenshot of the GUI of the software product that includes customizable UI features. In this manner, a user, such as a partner, specifying customizations may first be provided with a UI context as to where and what screenshot includes particular customizations. Additionally, the customization, once specified using items listed in bottom portion 220, may then be automatically implemented and displayed to the user thereby providing an automated in-place previewer within the software product's UI so that user can see the visual affect (e.g., look and feel) of the UI customizations. In this manner, the user may be provided with a complete and standard list of customizable features or options of the software product so that the user knows all such features that are available for customization in the software product. Additionally, the customer is provided with an automated UI look and feel preview system whereby such specified customizations are automatically applied in the context of the particular UI screenshot before the completed product is delivered to the user.

In this example 200, tab 1-1 210a, if selected, displays in portion 210 the UI features of the software product generally referred to as settings. Tab 1-2 210a, if selected, displays in portion 210 the UI features of the software product generally referred to as the dashboard, such as providing user controls and feedback regarding the status of the data storage system (e.g., used and free storage space; hardware and software errors detected of different data storage system components such as physical storage devices, power supplies, etc.). Tab 1-3 210c, if selected, displays in portion 210 the UI features of the software product generally referred to as system view. In this example, tab 210b is selected and therefore portion 210 may display the screenshot including customizable and customized UI elements of the dashboard. Portion 220 may include a table or list of items which are customizable in the different software product screenshots associated with tabs 210a-c.

Referring also to FIG. 3B, shown is further detail regarding element 220 of FIG. 3A as may be included in an embodiment in accordance with techniques herein. The table of customizable UI elements may include an entry for each customizable UI element. The table may include 4 columns—index 252, description 254, format 256 and customization 258. Index 252 may uniquely identify a particular UI element which may be customized in a particular screenshot. Description 254 is a brief description of the UI elements available for customization. Format 256 provides format information on the customizable UI element or features. Customization 258 is where the user specifies the customized value or other input that may replace an existing default. To further illustrate, entry 262 indicates that the application name is a string (256), is displayed in multiple screenshots (254), and a customized application name may be specified via input string entry (258) and the results of the customized application name may be viewed in the settings screenshot 1-1 (e.g., by selecting the tab 210a). Row 262, column 258, indicates that the string name of Unisphere is currently set as the customized application name. By selecting tab 210a, the user may preview the resulting customized application name as it will appear in the final customized software product. In this manner, the user may make any desired changes to a customized feature specified in 258 and is provided with feedback, such as regarding the look and feel of the customization in the application or software product UI, prior to generating the customized software product. A user can then make any further modifications to the customized feature desired and repeat the foregoing process of previewing how the customizations will appear in the UI of the customized software product.

Entry 264 indicates that a customizable icon (254) is displayed in a particular picture format (256), that a customized icon image may be specified via image or icon file upload (258) and the results of the customized icon may be viewed in the dashboard screenshot 1-2 (e.g., by selecting the tab 210b). Row 264, column 258, indicates that, by selecting the Upload button, a user may enter a location of an image file such as may be included in a file local to the user's system. The image file uploaded includes the customized image icon. The resulting customized image icon file uploaded may be previewed as it will appear in the final customized software product by selecting tab 210b. In the example of FIG. 3A, where tab 210b may be selected, element 211 may denote the resulting customized icon displayed (where the customized icon may be previously specified using entry 264).

Entry 266 indicates that a customizable data storage system model name prefix (254) has a default value of "Unity" (256), that a customized prefix may be specified via a text input field (258), and the results of the customization be viewed in the screenshot 1-3 (e.g., by selecting the tab 210c). Row 266, column 258, indicates that a customized value of CNX may be entered as the customized prefix. The resulting customized prefix may be previewed as it will appear in the final customized software product by selecting tab 210c.

Entry 268 indicates that a customizable model name mapping (254) has a default value of "300" (256), that a customized model name may be specified via a text input field (258), and the results of the customization be viewed in the screenshot 1-3 (e.g., by selecting the tab 210c). Further, the index 1-3.1 may denote a particular UI element in the displayed screenshot for 1-3 system view, which may be annotated in the displayed screenshot 1-3 when tab 210c is selected. In this manner, there may be a direct correspondence for identification by a user performing the customizations between a customized specified for an entry such as 268 and its resulting customized UI element preview as will appear in a customized screenshot such as 1-3 system view. In this example, entries 266-274 may all be previewed in connection with screenshot associated with system view 1-3 tab 210c where the particular different index values of each of the foregoing entries in 250 may be associated with a different displayed UI element displayed with the same index value. Row 268, column 258, indicates that a customized value of 3000 may be entered as the customized value (overriding the default 300). The resulting customized value may be previewed as it will appear in the final customized software product by selecting tab 210c.

Entry 270 indicates that a customizable model name mapping (254) has a default value of "400" (256), that a customized model name may be specified via a text input field (258), and the results of the customization be viewed in the screenshot 1-3 (e.g., by selecting the tab 210c). Further, the index 1-3.2 may denote a particular UI element in the displayed screenshot for 1-3 system view, which may be annotated in the displayed screenshot 1-3 when tab 210c is selected. In this manner, there may be a direct correspondence for identification by a user performing the customizations between a customized specified for an entry such as 268 and its resulting customized UI element preview as will appear in a customized screenshot such as 1-3 system view. Row 270, column 258, indicates that a customized value of 4000 may be entered as the customized value (overriding the default 400). The resulting customized value may be previewed as it will appear in the final customized software product by selecting tab 210c.

Entry 272 indicates that a customizable support link URL/hyperlink (254) has a default value of "Dell.com/support" (256), that a customized support link URL (such as of the partner's website) may be specified via a text input field (258), and the results of the customization be viewed in the screenshot 1-3 (e.g., by selecting the tab 210c). Further, the index 1-3.3 may denote a particular UI element in the displayed screenshot for 1-3 system view, which may be annotated in the displayed screenshot 1-3 when tab 210c is selected. In this manner, there may be a direct correspondence for identification by a user performing the customizations between a customized specified for an entry such as 268 and its resulting customized UI element preview as will appear in a customized screenshot such as 1-3 system view. Row 272, column 258, indicates that a customized value of Partner.com/support may be entered as the customized value (overriding the default link to Dell.com/support). The resulting customized value for entry 272 may be previewed as it will appear in the final customized software product by selecting tab 210c. It should be noted that entry 272 may be a selectable hyperlink displayed in a user interface where the user may select the hyperlink for support regarding the data storage system or particular components. For example, the support hyperlink customized by entry 272 may redirect the user to the partner website location rather than the OEM default website location. The support link may be a link to a web page displaying different available support options (e.g., online interactive chat, phone support, email problem submission) provided by the partner.

Entry 274 indicates that a customizable UI element, such as a button, 1 has a default value of enabled (256), that a customized value affecting the look and feel of the button or other UI element may be specified via a text input field (258), and the results of the customization be viewed in the screenshot 1-3 (e.g., by selecting the tab 210c). Further, the index 1-3.4 may denote a particular UI element in the displayed screenshot for 1-3 system view, which may be annotated in the displayed screenshot 1-3 when tab 210c is selected. In this manner, there may be a direct correspondence for identification by a user performing the customizations between a customized specified for an entry such as 268 and its resulting customized UI element preview as will appear in a customized screenshot such as 1-3 system view. Row 274, column 258, indicates that a customizable link or button is included in the UI which is enabled by default and is customized in this example to be hidden so that the button or link does not appear in the customized software product UI. The resulting customized value for entry 274 may be previewed as it will appear in the final customized software product by selecting tab 210c. It should be noted that entry 274 may be a selectable UI element (e.g., button) which if enabled is displayed in a user interface, and where if enabled, the user may select the UI element and be redirected to the OEM's online store (such as a website location of the OEM website where additional OEM products and components are available for purchase). In this example, the UI element is customized to hidden by entry 274 so the resulting customized UI of the software product will not include the UI element corresponding to entry 274. As known in the art, different attributes may be associated with different UI elements. Such attributes may affect the look and feel of the UI element. One such attribute as noted above may have a value affecting whether the UI element is enabled, disabled (e.g., may be displayed but greyed out denoting disabled function/feature), or hidden (e.g., nothing is displayed for the UI element) in the resulting user interface. More generally, the default attribute value such as in connection with entry 274 may be a default value that is any of enabled, hidden, or disabled, and customization may be to modify the default value to a different one of the foregoing.

Once the user has entered desired customizations using the customization page and the generation wizard, the user may submit the customizations, such as via selecting button 207 of FIG. 3A. In response to selecting 207, the customizations specified (e.g., such as via screenshots described in connection with FIGS. 3A and 3B) may be collectively included in a request submitted that triggers further automated processing for generation of a customized software product or package consistent with other discussion herein.

As discussed elsewhere herein, the customizations may include modifications of default attributes of various customizable UI elements such as displayed text strings, displayed images or icons, hyperlink or URL location identifying a target website location to which a user is redirected in a web browser upon selecting the associate UI element, whether the UI element and associated functionality is enabled, disabled or hidden in the displayed UI, and attributes affecting other look and feel aspects (e.g., visual aspect such as color or font of displayed text; whether text is bolded or italicized) of the software product and its UI. Part of the automated generation may include generating customized resource files and configuration files. A resource file may, for example, specify the customized attributes entered by the user as described in connection with FIGS. 3A and 3B. In this manner, the automated processing may include automatically generating the resource files including the customized values for attributes of the UI elements for the software product. The customized resource files may be included in the final software product. The resource files may be written in any suitable language. For example, in at least one embodiment, the resource files may be HTML or XML files including the customized attributes and/or customized attribute values. Additionally, the automated processing may include generating customized configuration files. For example, in at least one embodiment, a configuration file may specify the particular files or folders used for the customized software product. For example, the configuration file may identify files and/or folders including the customized images or icons such as, for example, uploaded by the user in connection with entry 264 of FIG. 3B.

Figure 4:
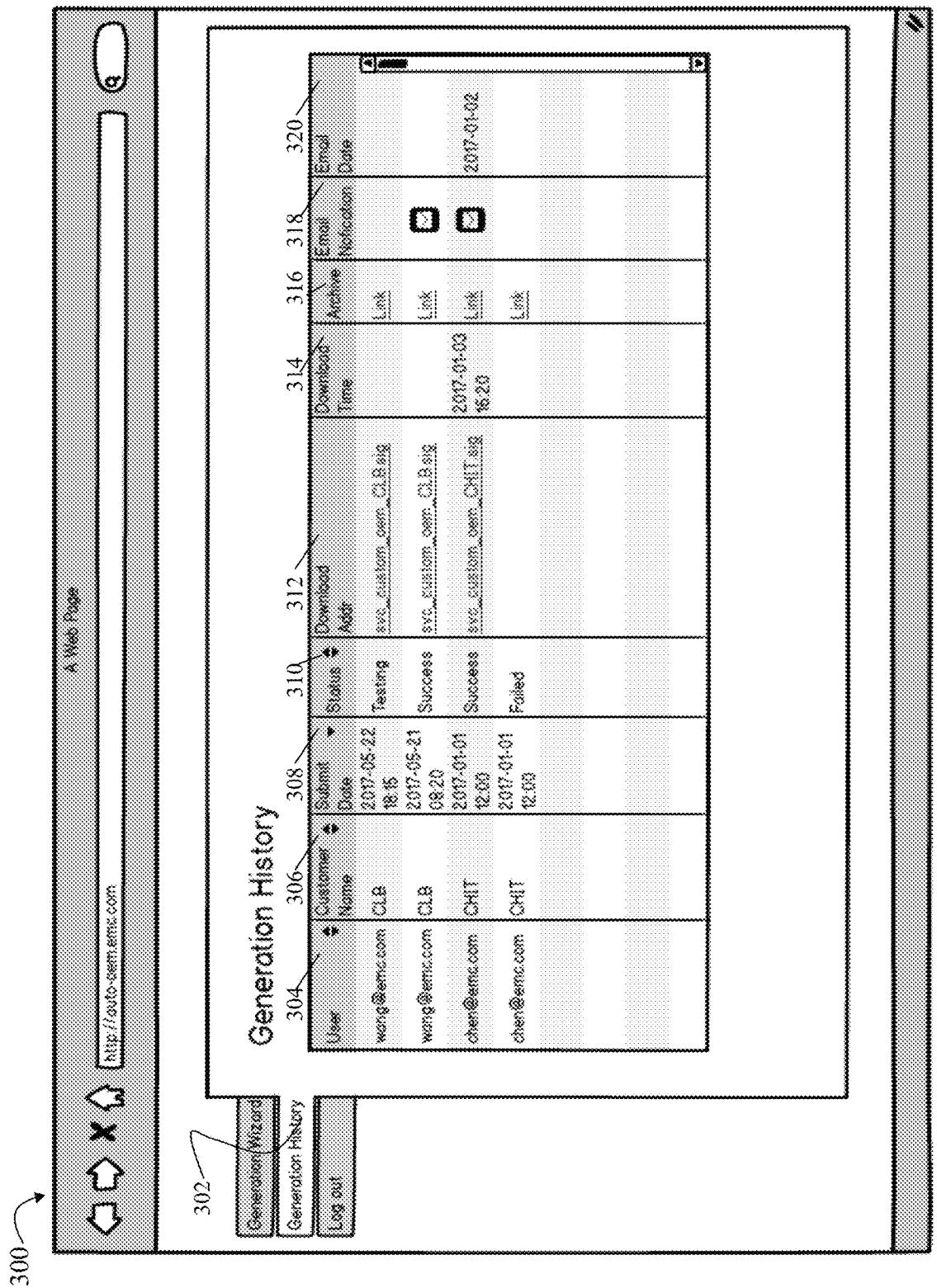

From the user's perspective, once the user has entered the customizations in connection with FIGS. 3A and 3B and submitted the request via selection of button 207, the user may be redirected to the generation history page as illustrated in FIG. 4.

Referring to FIG. 4, shown is an example 300 of a screenshot of a UI that may be used in connection with techniques herein. The example 300 illustrates contents of the generation history page mentioned above which includes information regarding the various generation jobs or tasks submitted in connection with customization of the software product. The example 300 may be displayed by a user subsequent to submitting a request for customization as noted above. Additionally, a user may request display of the screenshot 300 in response to selecting panel 302 of the UI. The generation history page includes content regarding various users prior generation requests and may include the following columns: user 304, customer name 306, submission date 308, status 310, download address 312, download time 314, archive line 316, email notification 318 and email date 320. The history of 300 may include an entry for each customization submission made such as described in connection with FIGS. 3A and 3B. Each entry may identify the user 304 and customer name 306 who submitted the generation request for customization, the submission data 308, the status 310 (e.g., whether the customized software product request is currently testing, has completed successfully, has failed), the download address 312 (e.g., identifying the location such as a website or URL destination where the customized software product can be accessed or downloaded from), the download time 314 (e.g., time at which the user downloaded the customized software product), archive link 316 (e.g., link or location from which to download archive files if the customized software product generation fails), email notification 318 (e.g., denoting whether email notification is enabled and has been sent to the user), and email date 320 (e.g., the date when the email notification has been sent).

In connection with email notification provided to a user regarding successful completion of the generated customized software product, the email may include the link or location from which the customized software product may be downloaded (e.g. the email notification may include the download address 312). The archive link 316 may be a link to archived files of the regeneration and may include the particular files such as of a failed generation job. In this manner, the archive link 316 may identify a location, for example, of the generated customized resource files, configuration files, testing logs (e.g., test cases, and failed test results) for possible further examination to determine the cause of the generation failure. Although not illustrated, an embodiment may also include a retry button or option for each entry so that, if selected, would resubmit the request for generation of the customized software product.

Figure 5:
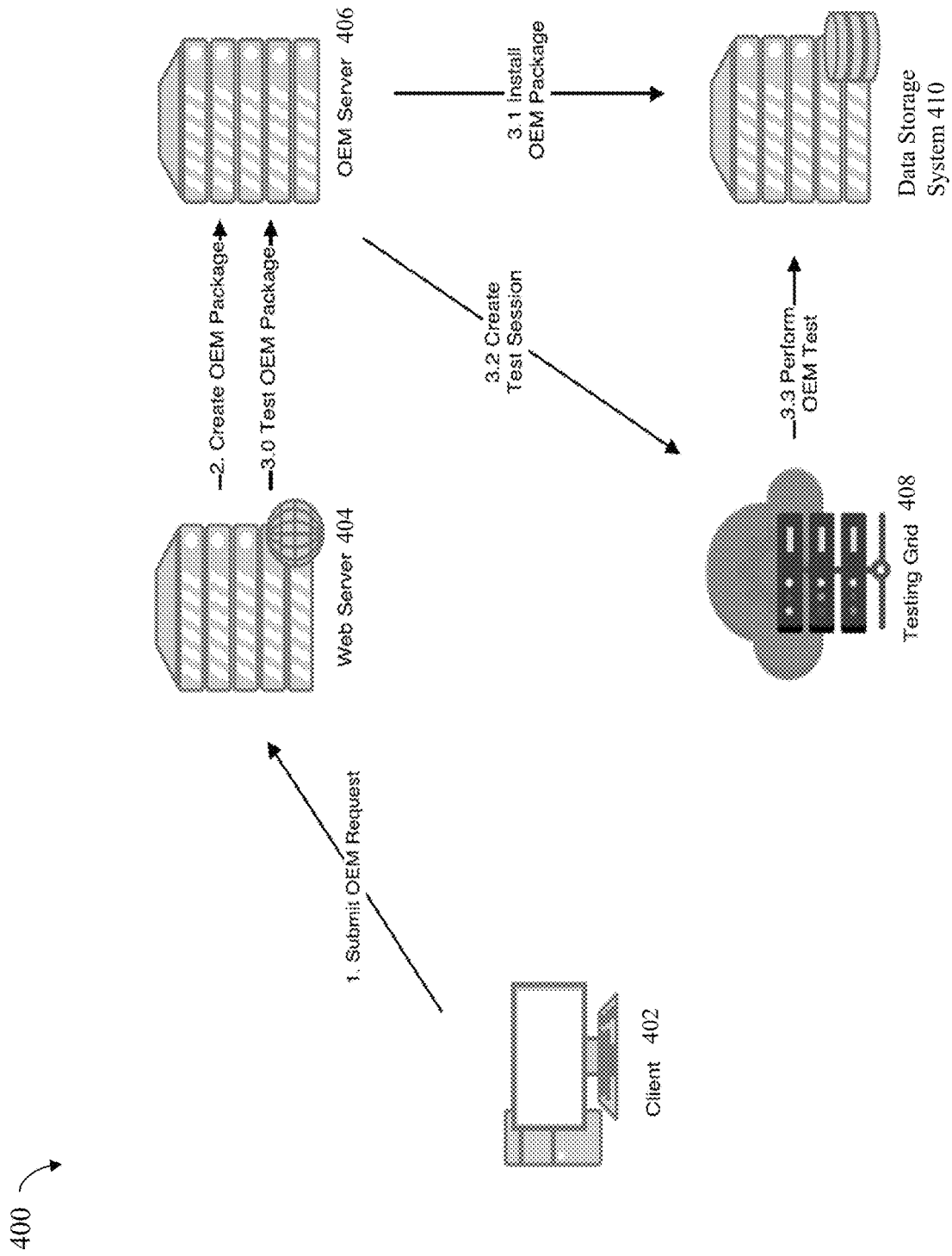

Referring to FIG. 5, shown is an example 400 of components and associated processing steps that may be performed in an embodiment in accordance with techniques herein. The example 400 includes the following components: the client 402, the web server 404, the OEM server 406, the testing grid 408 and data storage system 410. The client 402 may be a device with a processor, such as a client computer, launching the web application upon which the user specifies the necessary customizations. For example, the client 402 may be client computer executing a web browser where the user specifies customizations as described in connection with FIGS. 3A and 3B.

Once the client 402 specifies the desired customizations, the user submits a request (e.g., OEM request) in step 1 to the web server 404. The web server 404 may include the following services: a web service that hosts the web application, a job service that queries job status and handles the uncompleted jobs (e.g., customization request for generation submitting) according to job state, and a generation/generating service that generates the customized resource files, configuration files, test cases, and the like, based on the submitted requests for customization. I at least one embodiment, the job service may also periodically update the generation history page such as illustrated in FIG. 4 based on the changing status and other associated job information.

In response to submitting a request for customization to the web server 404, processing is performed in a step 2 to create the customized software product (e.g., also referred to as OEM package such as illustrated in FIG. 5). Subsequent to completing step 2 that creates the customized software product, a step 3 is performed to test the customized software product or OEM package. In at least one embodiment, steps 2 and 3 may be performed by services of the OEM server 406. In particular, the OEM server 406 may include a packaging service that builds and creates and OEM package based on the customized files where the OEM package may be the customized software product. The OEM server 406 may also include a testing service that coordinates testing performed for the customized software product generated by the packaging service.

Responsive to the OEM server 406 receiving a request in step 3 from the web server to test the customized software product generated (by step 2), the OEM server installs in step 3.1 the OEM package or customized software product on data storage system 410. In step 3.2, the testing service of the OEM server 406 requests creation of a test session on the testing grid 408 Responsive to step 3.2, the testing grid 408 then performs step 3.3 to perform the requested testing on the installed customized software product (installed on the data storage system 410). In at least one embodiment, the test grid may include a test server and several test nodes with processors. The testing service (of the OEM service 406) may issue the request of step 3.2 (to the testing grid) that requests the test session from the test server (of the testing grid 408) to perform the desired testing in the test nodes (of the testing grid 408).

In at least one embodiment, a template may be generated based on a customization request submitted by a user (e.g., such as described in connection with FIGS. 3A and 3B). The template for the user may include customizations made by a user for a particular version of a software product or package. For example, the template specifies all customizations entered by the user during a customization session for a particular version of the software product. Subsequently, the next time the same user logs in, such as described in connection with FIGS. 3A and 3B, to perform subsequent customizations for the same or a different version of the software product, the template may be used to load in an initial set of default customizations for the user. The user may then make any further desired customizations or simply reuse the same set of customizations included in the template. The user may be provided with an option of further updating his/her template to include any further customizations, creating a new additional template with a different set of customizations, and the like.

In at least one embodiment, test cases may be automatically created for the customizations requested by the user. Such automatic generation may further include automatically modifying an existing test source code module and/or adding an additional test source code module to handle desired testing for the customizations. Further, in at least one embodiment, particular test source code modules and test cases which are tested may be based on impacted features of the software product which have been modified due to the customizations. Such selection of particular test cases and test source code modules may be performed in an automated manner in efforts to reduce the amount of testing and also to sufficiently target and test particular features of the software product impacted by the user customizations. In this manner, the particular tests and test cases run may be selected based on the customizations and characterized as dynamic and varying in accordance with the particular customizations made by the user. To further illustrate, assume a user requests only a single customization regarding a UI element that, if selected, transfers control to a partner-specified website/URL rather than a default OEM specified website/URL (e.g. such as described in connection with element 272 of FIG. 3B). Processing in accordance with techniques herein may include automatically generating a new test case to test the above-noted customized functionality (e.g., transfer of control to the partner-specified website/URL) and further include generating new test source code or modifying an existing test source code module to include the new test case. If the user makes no other customizations, then the processing may only include selecting the particular testing source code modules and test cases which test functionality of the customized UI features.

Figure 6:
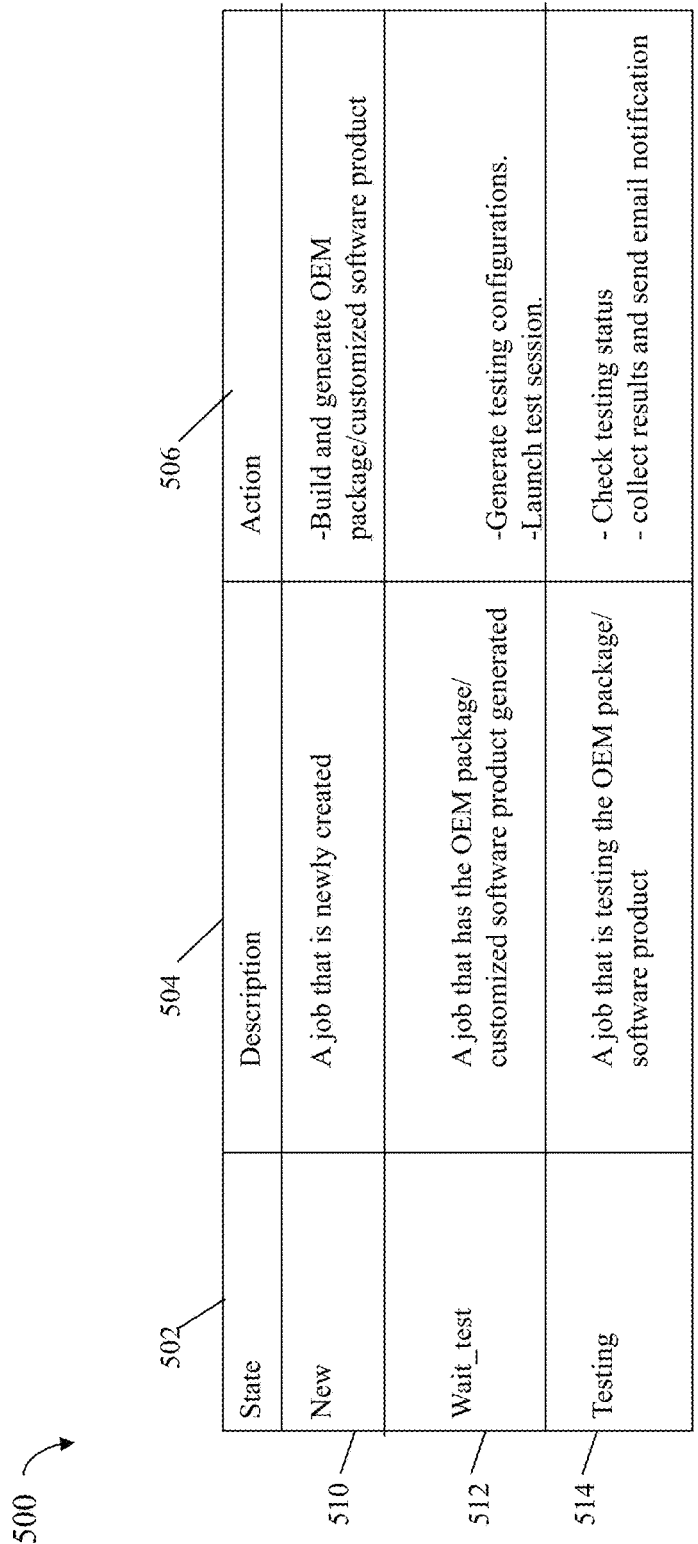
FIG. 6 is an example of incomplete job states that may be used in an embodiment in accordance with techniques herein.

In at least one embodiment, the job service of the web server 404 may periodically poll incomplete jobs (which are requests for generating customized software products) and execute corresponding actions based on their states. In such an embodiment, FIG. 6 is an example illustrating the job states and associated descriptions and actions that may be performed by the job service based on the particular job states. The job states of the example 500 may denote the different job states associated with an incomplete job in at least one embodiment. In addition to the states of 500, a job may also be completed and have an associated state of success or failure, depending on the outcome of testing. The example 500 includes a table with the following columns: state 502, description 504 and action(s) 506. The table includes an entry or row for each state. Row 510 indicates that a job has a NEW state for a newly created job (504) for which the customized OEM package/software product has not yet been created. Accordingly, the action associated with the new state is to build and generate the OEM package or customized software product. A job may transition from the new state to the WAIT_TEST state denoted by entry 512 once the job's OEM package/customized software product has been generated (504). When a job is in the WAIT_TEST state, actions performed include generating testing configurations and then launching the testing session (that executes the desired test cases of the testing configurations). A job transitions from the WAIT_TEST state to the TESTING state while testing is being performed for the job's OEM package/customized software product. When a job is in the TESTING state, actions performed include checking the testing status, and once successful testing has completed, collecting the test results and sending an email notification (such as described in connection with FIG. 4). A job transitions from the TESTING state to a complete state denoting either success or failure of the testing performed.

Figure 7:
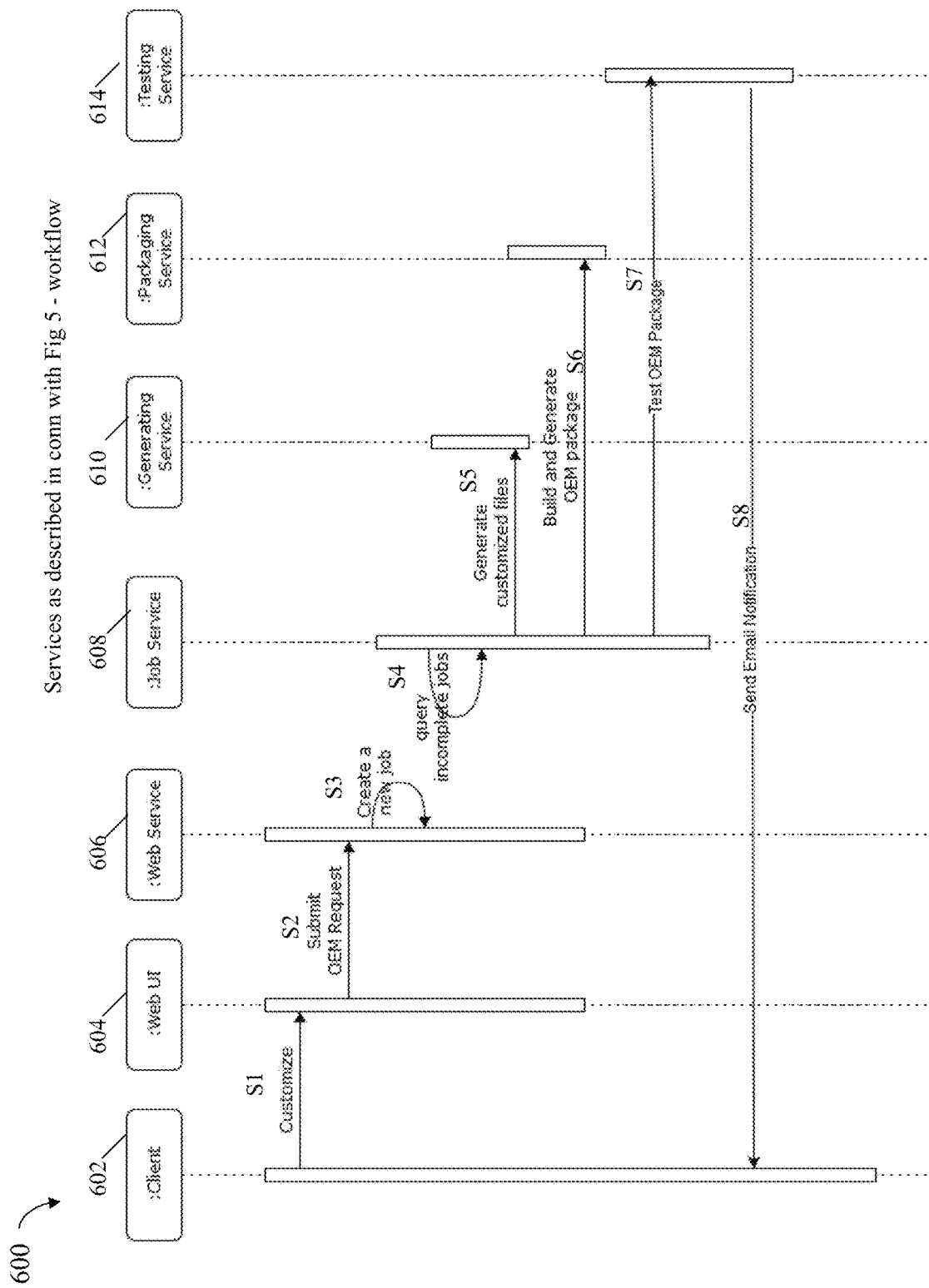
FIG. 7 is an illustration of a detailed workflow diagram of an embodiment in accordance with techniques herein.

Referring to FIG. 7, shown is an example of a detailed workflow diagram in an embodiment in accordance with techniques herein. The example 600 illustrates processing workflow between components described elsewhere herein, such as described in connection with FIG. 5 and also the generator or customization UI. The example 600 includes the following components: client 602, web UI 604, web service 606, job service 608, generating service 610, packaging service 612 and testing service 614. In a first step S1, customizations are obtained from the client 602 using the web UI 604 (e.g., such as illustrated in FIGS. 3A and 3B). The customizations are included in a request submitted in step S2 to the web service 606 whereby a new job for generating a customized software product is created in step S3. In at least one embodiment, the list of pending jobs and associated information used by the various services may be stored in a database which may be periodically queried by the job service 608 in step S4. The job service 608, as described above in connection with FIG. 6, may perform various actions depending on the particular current state of each job at different points in time. For a NEW job state (e.g., entry 510 of FIG. 6), step S5 may be performed by the job service 608 to generate the customized files (S5) and build and generate (S6) the customized software product. In step S5, the job service 608 communicates with the generating service 610 to perform processing to generate customized resource files, configuration files, image files, and the like, based on the specified customizations obtained in step S1. Subsequently in connection with step S6 for the NEW job state, the job service 608 communicates with the packaging service to build and generate the customized software product or package (that includes the customized files generated in step S5). For a WAIT_TEST job state (e.g. entry 512 of FIG. 6), step S7 may be performed by the job service 608 to test the customized software product or package (generated by step S6). For a TESTING job state, once testing has been successfully completed for the customize software product, step S8 may be performed to send an email notification to the customer or user which initiated the request for customization in step S1.

Figure 8:
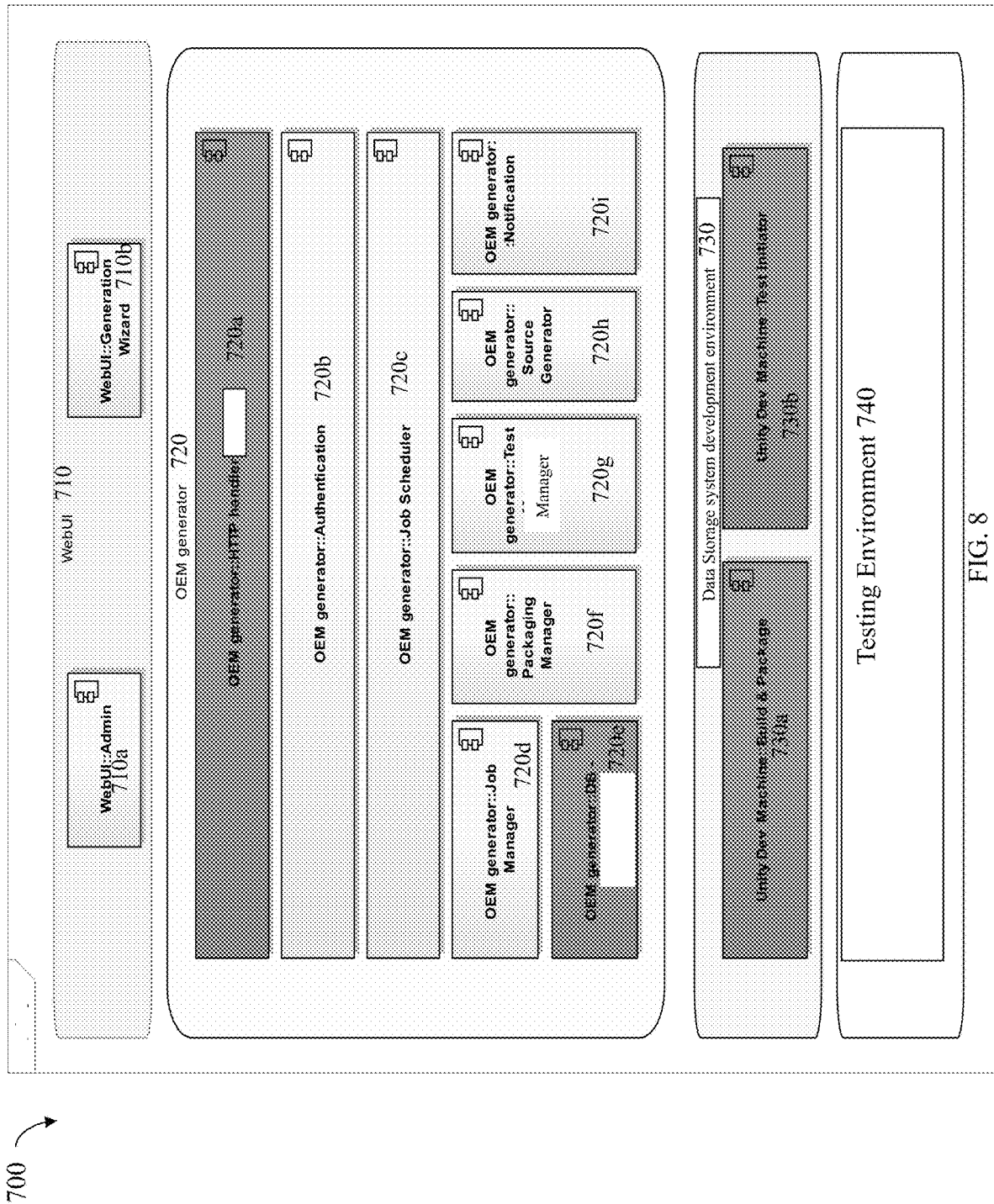

Referring to FIG. 8, shown is an example 700 illustrating different components that may be included in an embodiment in accordance with techniques herein that implement that various services and perform processing as described herein. The example 700 may be characterized as another view of modules or components implementing techniques herein. The example 700 includes Web UI component 710 comprising a Web UI administration module 710 and generation wizard 710*b*. Element 710*b* may denote the generation wizard and associated UI screenshots and functionality such as described in connection with FIGS. 3A and 3B. The OEM generator 720 may include: HTTP handler 720*a* (e.g., interface handler between Web UI 710 and OEM generator 720), authentication module 720*b* (e.g., handles user login/authentication), job scheduler 720*c* and job manager 720*d* (e.g., handle creation and management of job requests), DB or database 720*e* (e.g., database including jobs for customization and associated status and other job information used by various components where the jobs are created as a result of customization requests received from clients as discussed elsewhere herein; various resource files, configuration files, image files, and the like, for the various user customizations may be stored in DB; user account information may be stored in DB; template for each user may be stored here where template includes prior customizations performed for different UI elements and features), packaging manager 720*f* (e.g., handles generation of customized software product or package), test manager 720*g* (e.g., handles test management including communications and interfacing between the OEM generator 720 and testing environment 740, and downloads new test cases for customization testing to the testing environment 740), source generator 720*h* (e.g., generates customized source code and files such as resource files and configuration files per requested customizations; generates new test cases and test code for testing the customizations), and notification module 720*i* (e.g., sends email notification to user upon successful testing completion).

The data storage system development environment 730 may include a build and package module 730*a* (e.g., which communicates with the packaging manager 720*f* and facilitates installation of the customized software product on the data storage system) and test initiator 730*b* (e.g., which communicates with the testing environment 740 and testing manager 720*g* to initiate testing of the customized software product or package installed).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of customizing a software product comprising:

displaying a user interface of a generation wizard to the user, wherein the user interface includes a first portion comprising a table listing customizable features of the software product and wherein the user interface includes a second portion used to preview any customization made to the software product using the first portion, wherein the second portion includes a tabbed list of a plurality of screenshots and associated screenshot identifiers, and wherein the table of the first portion includes, for each of the customizable features, an index uniquely identifying said each customizable feature and wherein the index for said each customizable feature includes a screenshot identifier of one of the plurality of screenshots of the tabbed list;

receiving customization information describing customizations to the software product requested by a user at a first point in time;

submitting a request including the customization information to a web service;

responsive to receiving the request, performing processing comprising:
creating, by the web service, a new job to generate a first customized version of the software product in accordance with the customization information of the request for the first point in time;
automatically generating at least one customized file in accordance with the customization information for the first customized version of the software product;
generating a template for the first customized version based on the customization information of the request for the first point in time;
generating the first customized version of the software product including the at least one customized file; and
testing the first customized version of the software product.

2. The method of claim 1, wherein the processing further comprises:
automatically generating a new test case in accordance with the customization information, and wherein said testing includes executing code that includes the new test case.

3. The method of claim 1, wherein said testing includes selecting one or more tests which test features of the software product affected by the customizations requested by the user.

4. The method of claim 1, further comprising:
loading, at a second point in time subsequent to the first point in time, the template that includes the customization information describing customizations made to the software product from the first point in time;
receiving, at a third point time subsequent to the second point in time, additional customization information specified by the user, wherein the additional customization information describes at least one additional customization to the software product requested by the user at the third point in time; and
creating a new template for a second customized version of the software product, wherein the template includes customizations specified by the template from the first point in time and includes the at least one additional customization described by the additional customization information from the third point in time.

5. The method of claim 4, wherein the generation wizard is used in connection with generating customized versions of the software product.

6. The method of claim 5, wherein the method further comprises:

specifying, using the user interface of the generation wizard, a first customization to the software product; and
in response to said specifying, automatically updating the second portion of the user interface of the generation wizard to display the result of the first customization.

7. The method of claim 6, wherein the displayed result of the first customization is performed without generating the first customized version of the software product.

8. The method of claim 6, wherein the first customization includes a modification to information displayed in a user interface of the first customized version of the software product.

9. The method of claim 6, wherein the first customization includes a modification to an icon displayed in a user interface of the first customized version of the software product.

10. The method of claim 9, wherein specifying the first customization includes providing an image file for a customized image to be displayed in a user interface of the first customized version of the software product rather than a default image.

11. The method of claim 6, wherein the first customization includes specifying a customized link displayed in a user interface of the first customized version of the software product and wherein, when the customized link is selected during execution of the first customized version of the software product, transfers control to a customized location identified in the first customization.

12. The method of claim 6, wherein the first customization includes modify an attribute of a user interface element that is displayed in a user interface of the first customized version of the software product, wherein the first customization includes modifying a default value for the attribute to a customized value for the attribute.

13. The method of claim 12, wherein the attribute affects a visual aspect of the user interface element.

14. The method of claim 4, wherein said processing includes:
determining whether testing of the first customized version of the software product has completed successfully; and
responsive to determining the first customized version of the software product has completed successfully, providing a notification to the user, wherein the notification identifies a website location from which the first customized version of the software product is downloadable.

15. The method of claim 1, further comprising:
periodically determining statuses of jobs, wherein each of the jobs has been created as a result of a different request for customizations to the software product, wherein said different request is made using the generation wizard; and
updating displayed information for the jobs in accordance with the statuses determined.

16. A system comprising:
at least one processor; and
a memory comprising code stored thereon, that when executed, performs a method of customizing a software product comprising:
displaying a user interface of a generation wizard to the user, wherein the user interface includes a first portion comprising a table listing customizable features of the software product and wherein the user interface includes a second portion used to preview any customization made to the software product using the first portion, wherein the second portion includes a tabbed list of a plurality of screenshots and associated screenshot identifiers, and wherein the table of the first portion includes, for each of the customizable features, an index uniquely identifying said each customizable feature and wherein the index for said each customizable feature includes a screenshot identifier of one of the plurality of screenshots of the tabbed list;

receiving customization information describing customizations to the software product requested by a user at a first point in time;

submitting a request including the customization information to a web service;

responsive to receiving the request, performing processing comprising:
creating, by the web service, a new job to generate a first customized version of the software product in accordance with the customization information of the request for the first point in time;
automatically generating at least one customized file in accordance with the customization information for the first customized version of the software product;
generating a template for the first customized version based on the customization information of the request for the first point in time;
generating the first customized version of the software product including the at least one customized file; and
testing the first customized version of the software product.

17. A non-transitory computer readable medium comprising code that, when executed, performs a method of customizing a software product comprising:
displaying a user interface of a generation wizard to the user, wherein the user interface includes a first portion comprising a table listing customizable features of the software product and wherein the user interface includes a second portion used to preview any customization made to the software product using the first portion, wherein the second portion includes a tabbed list of a plurality of screenshots and associated screenshot identifiers, and wherein the table of the first portion includes, for each of the customizable features, an index uniquely identifying said each customizable feature and wherein the index for said each customizable feature includes a screenshot identifier of one of the plurality of screenshots of the tabbed list;
receiving customization information describing customizations to the software product requested by a user at a first point in time;
submitting a request including the customization information to a web service;
responsive to receiving the request, performing processing comprising:
creating, by the web service, a new job to generate a first customized version of the software product in accordance with the customization information of the request for the first point in time;
automatically generating at least one customized file in accordance with the customization information for the first customized version of the software product;
generating a template for the first customized version based on the customization information of the request for the first point in time;
generating the first customized version of the software product including the at least one customized file; and
testing the first customized version of the software product.

18. The non-transitory computer readable medium of claim 17, wherein the processing further comprises:
automatically generating a new test case in accordance with the customization information, and wherein said testing includes executing code that includes the new test case.

19. The non-transitory computer readable medium of claim 17, wherein said testing includes selecting one or more tests which test features of the software product affected by the customizations requested by the user.

20. The non-transitory computer readable medium of claim 17, wherein the method further comprises:
loading, at a second point in time subsequent to the first point in time, the template that includes the customization information describing customizations made to the software product from the first point in time;
receiving, at a third point time subsequent to the second point in time, additional customization information specified by the user, wherein the additional customization information describes at least one additional customization to the software product requested by the user at the third point in time; and
creating a new template for a second customized version of the software product, wherein the template includes customizations specified by the template from the first point in time and includes the at least one additional customization described by the additional customization information from the third point in time.

21. The non-transitory computer readable medium of claim 20, wherein the generation wizard is used in connection with generating customized versions of the software product.

22. The non-transitory computer readable medium of claim 21, wherein the method further comprises:
specifying, using the user interface of the generation wizard, a first customization to the software product; and
in response to said specifying, automatically updating the second portion of the user interface of the generation wizard to display the result of the first customization.

* * * * *

UNITED STATES PATENT AND TRADEMARK OFFICE
CERTIFICATE OF CORRECTION

PATENT NO.       : 10,509,631 B2
APPLICATION NO.  : 15/953766
DATED            : December 17, 2019
INVENTOR(S)      : Wei Duan et al.

Page 1 of 1

It is certified that error appears in the above-identified patent and that said Letters Patent is hereby corrected as shown below:

On the Title Page

Column 2, Item (57) Abstract, Lines 6-7:
Delete "a new job to generated"
And insert -- a new job to generate --

Signed and Sealed this
Twenty-fifth Day of February, 2020

Andrei Iancu
*Director of the United States Patent and Trademark Office*